United States Patent [19]
Maurel et al.

[11] 3,862,293
[45] Jan. 21, 1975

[54] PROCESS FOR THE CONTINUOUS ACID TREATMENT OF CRUDE CLAYS AND SCHISTS

[75] Inventors: Pierre Maurel; Pierre Duhart, both of Aix-en-Provence, France

[73] Assignee: Aluminum Pechiney, Paris, France

[22] Filed: Nov. 21, 1972

[21] Appl. No.: 308,541

[30] Foreign Application Priority Data
Nov. 25, 1971 France .............................. 71.42250

[52] U.S. Cl. ................. 423/126, 423/111, 423/128, 423/131, 423/140, 423/146, 423/150, 423/184, 423/197, 423/208, 75/111, 75/112, 75/115

[51] Int. Cl. ............................ C01f 7/22, C01f 7/26

[58] Field of Search .......... 423/111, 140, 184, 128, 423/625, 633, 495, 499, 551, 126, 131, 146, 150, 197, 208; 75/112, 114, 115

[56] References Cited
UNITED STATES PATENTS

| | | | |
|---|---|---|---|
| 1,434,088 | 10/1922 | Christensen | 75/115 |
| 2,563,623 | 8/1951 | Scott | 75/115 |
| 2,835,569 | 5/1958 | Reynaud et al. | 75/114 |

FOREIGN PATENTS OR APPLICATIONS

| | | | |
|---|---|---|---|
| 1,558,347 | 2/1969 | France | 423/111 |

Primary Examiner—Herbert T. Carter

[57] ABSTRACT

A process for the continuous treatment of aluminoferrous ore of the clay or schist type for recovery of alumina, iron, magnesium and alkali metals, including the steps of attacking the crude ore with hot, concentrated sulphuric acid, precipitating the aluminum with HCl in the form of hydrated chloride, and precipitating the iron and the potassium in the form of a double sulphate after oxidation of the iron from its divalent state by injection of chlorine into the sulphuric solution before recycling.

5 Claims, 1 Drawing Figure

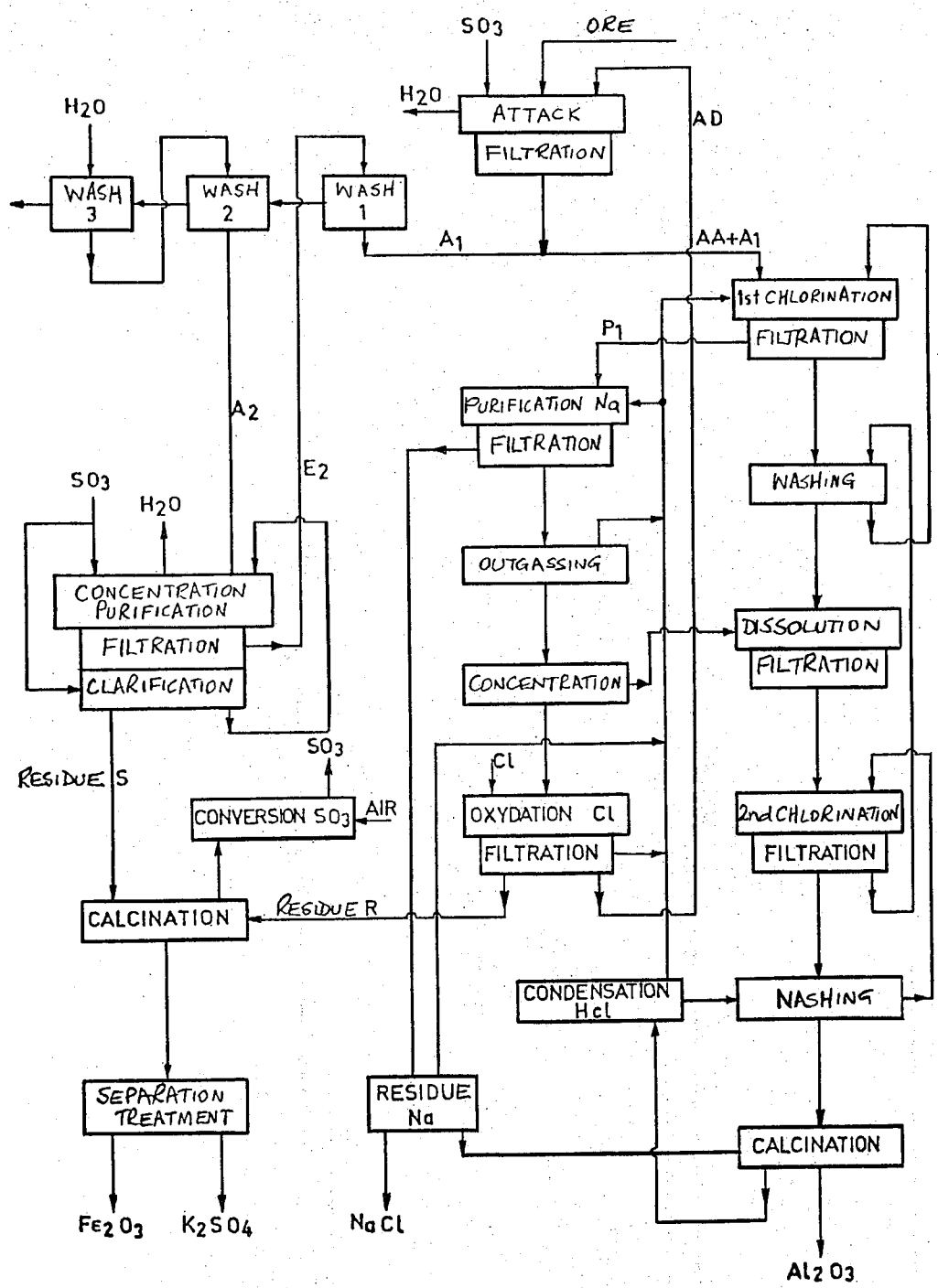

PROCESS FOR THE CONTINUOUS ACID TREATMENT OF CRUDE CLAYS AND SCHISTS

This invention relates to a continuous process for the acid treatment of ores of the clay and schist type in order to recover aluminum, iron and magnesium in the form of commercially usable oxides and potassium in the form of a double salt.

For this purpose, use is made of a series of known chemical reactions including attacking the ore with hot, concentrated sulphuric acid and after suitable dilution of the product of this attack, precipitating aluminum in the form of its hydrated chloride, which is purified by crystallization and washing, and finally dissociated under heat to yield pure alumina. The other metals, present in their sulphate form, are purified by crystallization, the iron and magnesium are converted to their oxides by calcination while the nondissociable potassium salt is separated and purified by crystallization. The silica, sodium and others of the various elements present in the ore are discarded.

The process of this invention is based on the combination of all these successive or simultaneous reactions into a continuous cycle, in a circuit in which some of the reactants are recycled indefinitely. This circuit comprises inlets for the introduction of starting material and outlets for the removal of useful products and for the removal of the residues.

When equilibrium is established, the composition of the recycled reactants remains relatively constant and the amount of compounds eliminated from the circuit correspond stoichiometrically, at any given time, to those which are introduced with the starting materials.

In the French patent No. 1,558,347 of Oct. 25, 1967, description is made of a process of this kind applicable to coal schists. Since these ores contain a considerable proportion of combustible organic compound and carbon, the ore was first roasted in oxidizing atmosphere, without the need for any external supply of fuel, and which simultaneously enabled the organic products to be removed and oxidation of iron present in the ore to the ferric state.

After sulphuric acid attack, the iron, converted to ferric sulphate, formed with the potassium sulphate a double salt which is only slightly soluble in sulphuric acid and which thus enabled most of the potassium from the ore to be eliminated from the liquid phase.

The described process cannot generally be directly applied to clays and schists which do not contain organic material, because oxidation of the iron by roasting in an oxidizing atmosphere necessitates the consumption of an economically unreasonable amount of fuel in the majority of cases.

In general, the iron is present in these ores either entirely or substantially entirely in the ferrous form. After sulphuric acid attack, the iron is present chiefly in ferrous form. Since this salt is substantially insoluble (approximately 12 g per liter in the attacking solution), it would be fairly easy to separate the iron from the aluminum, although potassium generally present in the ore in amounts within the range of 3–5% by weight would then become much more difficult to separate from the aluminum.

Thus it is an object of this invention to provide a new and improved process for the treatment of ores of the type described for removing aluminum, iron, magnesium and potassium in an efficient and economical manner.

In accordance with the practice of this invention, the ferrous sulphate produced by attack on the crude ore is partially oxidized by introducing chlorine into the concentrated sulphuric acid solution before it is recycled to attack the ore, the quantity of chlorine being calculated such that, following oxidation, the amount of ferric ions is substantially equal to the amount of potassium ions so as to insure precipitation of the double salt $K_2SO_4, Fe_2(SO_4)_3$, which is separated by filtration before the acid is recycled.

The reaction $2FeSO_4 + Cl_2 + H_2SO_4 \rightarrow Fe_2(SO_4)_3 + 2\ HCl$ yields hydrochloric acid as a by-product. The quantity of hydrochloric acid formed is governed essentially by the content of ferric iron and potassium in the ore. In general, the amount of hydrochloric acid thus produced corresponds substantially to the loss of HCl due to elimination of the sodium present in the ore in the form of NaCl. In certain cases, however, an excess of hydrochloric acid can be produced. This is then subjected to an oxidizing treatment with air, followed by known processes to regenerate the chlorine for recycling.

The quantity of chlorine to be used is calculated such that the amount of ferric iron, including that which is initially present in the ore, brings about formation of the complex $Fe_2(SO_4)_3, K_2SO_4$, with the potassium present in the ore. Since the solubility of this complex salt is far from negligible, only partial precipitation occurs and appreciable amounts of iron and potassium will remain in solution in the liquors which are continuously recycled.

The cycle of reactions is conducted in a manner such that the concentration of iron, potassium and sodium salt is sufficiently high to enable these metals to be readily eliminated by precipitation but, at the same time, in such a way that these concentrations remain sufficiently low to insure that the aluminum chloride precipitates with entrainment of only small quantities of impurities which can be substantially completely eliminated by washing.

The stage in the circuit at which the chlorine should be introduced to obtain the best results has been determined by experimentation. Introduction into the attacking vat is not desirable because the liquid therein is at boiling point and because, under these conditions, the rate at which the chlorine dissolves and the rate at which the iron is oxidized is not sufficient.

Introduction into the concentrated solution obtained after washing the residues left after the attack is not suitable because this phase contains too little potassium.

Best results are obtained by introducing the chlorine into the concentrated sulphuric acid solution immediately before it is returned to the attacking vat. This solution is cooled to around 115°–120°C during introduction of the chlorine. The quantities of salt and potassium present therein are sufficient to insure precipitation of the double sulphate. Part of the hydrochloric acid, formed during the reaction, remains in solution, although the liquid is subsequently heated to boiling temperature and most of the hydrochloric acid is driven off in gaseous form. The latter is cycled to the generally gaseous hydrochloric acid circuit.

The sequence of operations, carried out on an ore of the schist type, is described in the following example, reference being made to the accompanying flow diagram.

Part of the solution circuit is similar to that of the aforementioned French patent. The novelty of the process of this invention, by comparison with the earlier process, resides in the use of crude ore and in the oxidation of a calculated quantity of ferrous iron into ferric iron by oxidation with chlorine.

For purposes of making it easier to understand, this working example is presented as though the operations had taken place sequentially, one after the other, although as a matter of fact the process is strictly continuous. The figures given correspond to the equilibrium state which is obtained only after a starting period during which the circulating liquors are progressively enriched.

These figures always relate to the same combination of the element with which they are concerned. For example, aluminum which, according to the points of the circuit, is in the form of silicate, sulphate, chloride or oxide, is always expressed as $Al_2O_3$, titanium as $TiO_2$, sodium as $Na_2O$, potassium as $K_2O$ and chlorine as HCl.

The example is calculated on the quantity of ore which gives one ton of pure alumina.

4420 Kg of crushed, air dried schist of the following composition is used as starting material:

| Compound | Proportion by weight | Total quantity | Soluble |
| --- | --- | --- | --- |
| $Al_2O_3$ | 26.11 % | 1154 kg | 1039 kg |
| $Fe_2O_3$ | 8.23 | 364 | 345 |
| $TiO_2$ | 1.04 | 46 | 9 |
| $Na_2O$ | 1.11 | 49 | 41 |
| $K_2O$ | 2.94 | 130 | 106 |
| $SiO_2$ | 50.90 | 2250 | — |
| miscellaneous | 4.42 | 196 | — |
| heating loss | 5.25 | 232 | — |

All of the soluble iron in this ore is present in ferrous form. The heat loss corresponds, above all, to the presence of residual humidity and carbon dioxide gas combined in the form of carbonates.

The ore is subjected to the action of 18471 m³ of a hot, concentrated recycle sulphuric acid (AD) which contains:

| Compounds | Concentration | Quantity |
| --- | --- | --- |
| $Al_2O_3$ | 6.23 g/l | 115 kg |
| $Fe_2O_3$ | 3.52 | 65 |
| $TiO_2$ | 0.16 | 3 |
| $Na_2O$ | 19.71 | 364 |
| $K_2O$ | 15.70 | 290 |
| $SO_3$ | 753.61 | 13,920 |

747 liters of sulphuric acid are added to the concentrated recycle $H_2SO_4$ described, corresponding to 993 kg of $SO_3$, to compensate the losses of acid in the residues and the removal of acid in the form of iron sulphate and potassium sulphate.

The attack is carried out with stirring for about 4 hours at 135° to 140°C, after which 15204 liters of liquid phase (AA) are separated by filtration from a solid phase impregnated with liquid. This solid phase constitutes the "sludges" which are subjected to a series of three countercurrent washes. The washer 3 is fed with pure water and discharges sterile residues: silica, unattacked ore and insoluble sulphates.

These residues, which weigh 2638 kg, contain:

| Compound | Proportion | Quantity |
| --- | --- | --- |
| $Al_2O_3$ | 4.36 % | 115 kg |
| $Fe_2O_3$ | 0.72 | 19 |
| $TiO_2$ | 1.40 | 37 |
| $Na_2O$ | 0.30 | 8 |
| $K_2O$ | 0.91 | 24 |
| $SiO_2$ | 85.29 | 2,250 |
| $SO_3$ | 0.49 | 13 |

The dilute aqueous solution issuing from washer 3 enters washer 2 which is fed, on the other hand, with the sludges issuing from washer 1.

The liquor $A_2$ issuing from washer 2 is charged with salts that are soluble in water but substantially insoluble in the attacking liquor, in particular ferrous sulphate and the mixed salt $Fe_2(SO_4)_3$, $K_2SO_4$. This liquor $A_2$ is introduced into a concentration tank in which the water is evaporated until the temperature of the liquid reaches 120°–125°C. The temperature is kept at this level for 4 to 5 hours. Sulphates, which precipitate during this operation, are filtered and washed with a quantity of 550 g/l of $H_2SO_4$ corresponding to 52 kg of $SO_3$. The washing liquid is returned to the concentration tank. The filtrate $E_2$, separated from the crystals, is used for the first wash. The crystals (referred to as residue S) are made up of various sulphates, consisting of:

| Compounds | Proportion | Quantity |
| --- | --- | --- |
| $Al_2O_3$ | 1.80 % | 19 kg |
| $Fe_2O_3$ | 19.38 | 207 |
| $TiO_2$ | 0.56 | 6 |
| $K_2O$ | 3.37 | 36 |
| $SO_3$ | 50.20 | 536 |

The iron is present in the form of a mixture of ferrous and ferric sulphates.

These sulphates are treated at the same time as those of the residue R produced at another point of the circuit.

The filtrate $E_2$, which is delivered to the inlet end of the washer 1, has a volume of 4271 m³ and contains:

| Compounds | Concentrations | Quantity |
| --- | --- | --- |
| $Al_2O_3$ | 35.12 g/l | 150 kg |
| $Fe_2O_3$ | 23.98 | 102 |
| $TiO_2$ | 0.23 | 1 |
| $Na_2O$ | 10.54 | 45 |
| $K_2O$ | 32.08 | 137 |
| $SO_3$ total | 587.92 | 2511 |
| $SO_3$ non-salified | 524.94 | 2242 |

In the first wash, the impregnating liquid is hardly diluted at all but merely displaced so that the soluble aluminum sulphate can be returned to the circuit and the substantially insoluble salts left in the residue. In this way, the volume of liquid is substantially the same at the inlet and outlet of the washer 1, although it is enriched in $Al_2O_3$, $Na_2O$ and $SO_3$ but impoverished in iron and potassium.

The volume of liquor $A_1$, issuing from the washer 1, amounts to 4271 m³ with the following composition:

| Compounds | Concentration | Quantity |
|---|---|---|
| $Al_2O_3$ | 52.21 g/l | 223 kg |
| $Fe_2O_3$ | 11.34 | 51 |
| $TiO_2$ | 0.23 | 1 |
| $Na_2O$ | 18.26 | 18 |
| $K_2O$ | 22.00 | 94 |
| $SO_3$ total | 637.26 | 2978 |
| $SO_3$ acid | 628.19 | 2683 |

Liquor $A_1$ is then mixed with the filtrate issuing from the attacking vat: AA. This mixture has a volume of 19475 m³ and the following composition:

| Compounds | Concentration | Quantity |
|---|---|---|
| $Al_2O_3$ | 58.28 g/l | 1135 kg |
| $Fe_2O_3$ | 10.42 | 203 |
| $TiO_2$ | 0.31 | 6 |
| $Na_2O$ | 20.80 | 405 |
| $K_2O$ | 18.48 | 360 |
| $SO_3$ | 740.23 | 14416 |
| $SO_3$ acid | 664.20 | 12945 |

This solution is too concentrated in sulphuric acid for the hydrated aluminum chloride to be precipitated by the addition of gaseous hydrogen chloride. It has to be diluted with water, but instead of using pure water, the washing and crystallization waters used for purification of the hydrated aluminum chloride are used for dilution. These washing waters, which only contain traces of metals, a little sulphuric acid and a considerable quantity of hydrochloric acid, are particularly suitable for diluting the sulphuric sulphate solutions, and have the advantage of introducing some of the hydrochloric acid in the form of a solution which is less expensive to recover than the anhydrous acid. The volume of the washing solutions used to dilute the mixture of liquors AA and $A_1$ amounts to 8.969 m³: it contains 3282 kg of HCl, 430 kg of $SO_3$ and traces of metal salts.

After dilution, 29.084 m³ of solution with the following composition are obtained:

| Compounds | Concentration | Quantity |
|---|---|---|
| $Al_2O_3$ | 39.20 g/l | 1140 kg |
| $Fe_2O_3$ | 7.12 | 207 |
| $TiO_2$ | 0.21 | 6 |
| $Na_2O$ | 14.13 | 411 |
| $K_2O$ | 12.45 | 362 |
| $SO_3$ | 510.45 | 14,846 |
| HCl | 112.85 | 3,282 |

To precipitate the hydrated aluminum chloride, this solution is cooled to 40°C while dissolving anhydrous hydrochloric acid therein up to its saturation point, which corresponds to about 2143 kg of HCl. The crystals of hydrated aluminum chloride that are formed are then filtered out. They contain, as impurities, sulphuric acid and metals present in the impregnating liquid. The chloride is purified by a series of countercurrent washes with a saturated solution of hydrochloric acid, and recrystallization from a dilute solution of hydrochloric acid, in which the salt is dissolved under heat and then reprecipitated by cooling and by saturation with hydrochloric acid. Aluminum chloride, which is thus obtained in an extremely high state of purity, is dissociated under heat into anhydrous alumina and hydrochloric acid. The hydrochloric acid is recycled partly in the form of an aqueous solution and partly in anhydrous form.

The mother liquors $P_1$, separated from the hydrated aluminum chloride, are essentially a mixture of sulphuric acid and hydrochloric acid. They contain, in solution, a little alumina and all the other metals which were present in the solution before the hydrochloric acid treatment. Their volume is 25.368 m³ and they contain:

| Compounds | Concentration | Quantity |
|---|---|---|
| $Al_2O_3$ | 5.64 g/l | 143 kg |
| $Fe_2O_3$ | 8.40 | 203 |
| $TiO_2$ | 0.24 | 6 |
| $Na_2O$ | 15.95 | 405 |
| $K_2O$ | 14.19 | 360 |
| $SO_3$ | 568.27 | 14,416 |
| Cl | 138.40 | 3,501 |

This solution, which has a temperature of 40°C, is cooled to 35°C while being kept saturated with hydrochloric acid by the addition of 294 kg of HCl gas. This causes the precipitation of a certain quantity of sodium and a little alumina in the form of their chlorides which are separated by filtration.

This residue (N), which weighs 199 kg (including 19.6% of water) contains:

| | | |
|---|---|---|
| $Al_2O_3$ | 11.06 % | 22 kg |
| $Na_2O$ | 19.60 | 39 |
| Cl | 49.75 | 99 |

The residue is calcined, which enables 19 kg of hydrochloric acid and 8 kg of alumina to be recovered. Finally, 159 kg of residue are rejected, containing 39 kg of $Na_2O$ out of the 41 kg of soluble $Na_2O$ present in the ore, and 14 kg of alumina which cannot be economically recovered.

Following separation of the sodium chloride precipitated from the liquor P, 25.667 m³ of a filtrate $P_1$ are obtained with the following composition:

| Elements | Concentration | Quantity |
|---|---|---|
| $Al_2O_3$ | 4.7 g/l | 121 kg |
| $Fe_2O_3$ | 7.91 | 203 |
| $TiO_2$ | 0.23 | 6 |
| $Na_2O$ | 14.26 | 366 |
| $K_2O$ | 14.02 | 360 |
| $SO_3$ | 561.66 | 14,416 |
| Cl | 144.00 | 3,696 |

By heating this solution, consisting essentially of free sulphuric acid and hydrochloric acid, most of the hydrochloric acid is volatilized off in the form of anhydrous HCl. 3437 kg of hydrochloric acid are thus returned to the hydrochloric gas circuit. The solution is then concentrated until its boiling temperature reaches 140°C. During this concentration, 259 kg of hydrochloric acid are recovered in the form of 5/979 m³ of a highly dilute solution. This solution is used to dissolve the hydrated aluminum chloride for purification by recrystallization. Accordingly, it is at this stage that the diluting water, introduced to facilitate precipitation of the aluminum chloride, is eliminated from the sulphuric acid circuit and introduced into the circuit for purifying aluminum chloride. The highly concentrated solution of sulphuric acid, obtained after this treatment, contains ferrous sulphate, ferric sulphate and potassium. It is cooled to 115°–120°C and the ferrous sulphate is oxidized to ferric sulphate by injecting 82 kg of chlorine over a period of about 15 minutes. This is followed by heating to boiling point, and the hydrochloric acid, formed during the oxidation, is introduced into the hydrochloric acid circuit. In the case of the present example, it compensates the loss of acid due to the elimination of sodium chloride. Accordingly, there is no need to regenerate chlorine, which may be necessary with ores of different composition.

Oxidation of the concentrated solution with chlorine causes the crystallization of metal sulphates which are separated by filtration. This solid phase (residue R) consists essentially of sulphates of iron and potassium. It contains 138 kg of $Fe_2O_3$ and 70 kg of $K_2O$, mixed with small quantities of other metals, 6 kg of alumina, 3 kg of $TiO_2$ and 2 kg of $Na_2O$.

This residue R is mixed with the residue S which was isolated from the washing waters of the solid phase separated after attack. It is calcined to dissociate the iron sulphates into oxides and into a mixture of $SO_3$ and $SO_2$ which is treated in a small contact unit to regenerate the sulphuric acid.

The oxides are isolated from the potassium sulphate by washing with water to dissolve out the sulphate, which is then purified by crystallization.

So far as the filtrate, which has a volume of 18471 liters, is concerned, it is the liquor AD, composition of which was specified at the beginning of this example and which is completely recycled to the vat in which the ore is attacked.

The process described above gives one ton of extremely pure alumina which is free from iron and alkali metals and which is particularly suitable for the electrochemical production of aluminum.

Recovery of the iron oxide and of the potassium, present in the schist used as starting material, markedly increases the economy of this process because 106 kg of $K_2O$ in sulphate form and 346 kg of commercially usable iron oxide are produced along with the one ton of alumina.

It will be understood that changes may be made in the details of formulation and operation without departing from the spirit of the invention, especially as defined in the following claims.

We claim:

1. A process for treating ores of the clay and schist type in which iron is present at least in part in the ferrous state, to recover aluminum and iron in the form of their oxides and potassium in the form of a soluble salt, comprising the steps of attacking the ore with a hot concentrated solution of sulphuric acid, separating the product of the attack into a solids portion and a liquid filtrate portion, treating the filtrate portion with hydrochloric acid and water, with cooling, to precipitate hydrated aluminum chloride, separating the precipitated hydrated aluminum chloride from the liquid phase resulting from the hydrochloric acid treatment, calcining the hydrated aluminum chloride to yield aluminum oxide, cooling the liquid phase and introducing gaseous hydrogen chloride to precipitate sodium chloride and aluminum chloride, separating the precipitated sodium chloride and aluminum chloride from the treated liquid phase to leave a filtrate, concentrating the filtrate from which the sodium chloride and aluminum chloride has been separated and introducing chlorine into the filtrate to oxidize ferrous iron present to ferric iron to bring about the formation of the insoluble double salt $Fe_2(SO_4)_3.K_2SO_4$, with the potassium present in the ore, removing the double salt, calcining the double salt to reduce the iron component to ferric oxide and the potassium component to potassium sulphate, and treating the product of calcination with aqueous medium to dissolve off the potassium sulphate from the insoluble ferric oxide.

2. The process as claimed in claim 1 in which the process is carried out as a continuous operation.

3. The process as claimed in claim 1 in which the filtrate following removal of the double salt is recycled to attack the ore.

4. The process as claimed in claim 1 which includes the step of concentrating the filtrate following the addition of gaseous hydrogen chloride.

5. A process for treating ores of the clay and schist type in which iron is present at least in part in the ferrous state to recover aluminum and iron in the form of their oxides and potassium in the form of a soluble salt comprising the steps of attacking the ore with a hot concentrated solution of sulphuric acid, separating the product of the attack into a solids portion (A) and a liquid filtrate portion, treating the filtrate portion with hydrochloric acid and water with cooling to precipitate hydrated aluminum chloride, separating the hydrated aluminum chloride and an acid filtrate containing the metals other than aluminum, purifying the hydrated aluminum chloride by successive dissolutions and recrystallizations, calcining the purified hydrated aluminum chloride to yield aluminum oxide, cooling the filtrate and introducing gaseous hydrogen chloride to precipitate sodium chloride and aluminum chloride, separating the precipitated sodium chloride and aluminum chloride to leave a filtrate, concentrating the filtrate from which the sodium chloride and aluminum chloride has been separated and introducing chlorine into the filtrate to oxidize ferrous iron present to ferric iron to bring about the formation of the insoluble double salt $Fe_2(SO_4)3.K_2 SO_4$ with the potassium present in the ore, removing the double salt, washing the solids portion (A) to form a liquid phase and a residue, eliminating the residue, concentrating the liquid phase to precipitate iron and potassium sulphates and a recycled liquid phase, separating the precipitate, adding this precipitate to the double sulphate salt, calcining this mixture to reduce the iron component to ferric oxide and the potassium component to potassium sulphate, treating the product of calcination with aqueous medium to dissolve off the potassium sulphate from the insoluble ferric oxide.

* * * * *